United States Patent [19]

Butcher et al.

[11] Patent Number: 4,626,755
[45] Date of Patent: Dec. 2, 1986

[54] SUMP PUMP MOTOR SWITCH CIRCUIT

[75] Inventors: James A. Butcher, Worthington; Harold A. Padgett, Lyons, both of Ind.

[73] Assignee: General Electric Company, Fort Wayne, Ind.

[21] Appl. No.: 681,535

[22] Filed: Dec. 14, 1984

[51] Int. Cl.<sup>4</sup> ............................................. H02P 5/08
[52] U.S. Cl. .................... 318/473; 318/325; 318/782; 318/793; 318/783; 361/23
[58] Field of Search ............... 318/473, 471, 472, 462, 318/475, 325, 321, 322, 672, 673, 780–797; 361/23–34

[56] References Cited

U.S. PATENT DOCUMENTS

| | | | |
|---|---|---|---|
| 1,853,865 | 4/1932 | Kingston | 318/784 |
| 2,165,082 | 7/1939 | Weber | 318/782 |
| 2,262,866 | 11/1941 | Spear | 318/785 |
| 2,610,313 | 9/1952 | Turnupseed et al. | 318/782 |
| 2,791,736 | 5/1957 | Schaefer | 318/782 |
| 3,018,649 | 1/1962 | Barbulesco et al. | 318/793 X |
| 3,041,515 | 6/1962 | Vaughan | 318/782 |
| 3,456,230 | 7/1969 | Matthews et al. | 338/200 |
| 3,691,415 | 10/1972 | Hancock et al. | 310/68 E |
| 3,790,730 | 2/1974 | Wyland | 318/793 X |
| 4,161,681 | 7/1979 | Rathje | 318/783 |
| 4,178,523 | 12/1979 | Lyerly | 310/71 |
| 4,229,634 | 10/1980 | Hickman et al. | 200/302 |
| 4,297,627 | 10/1981 | Schaefer | 318/785 X |
| 4,341,987 | 7/1982 | Fisher | 318/785 X |
| 4,348,626 | 9/1982 | London | 318/785 X |
| 4,426,770 | 1/1984 | Frank | 29/596 |
| 4,484,116 | 11/1984 | Ellicott et al. | 318/325 |

OTHER PUBLICATIONS

Arrow Hart Brochure, "Sump Pump Switches".

Primary Examiner—William M. Shoop, Jr.
Assistant Examiner—Shik Luen Paul Ip
Attorney, Agent, or Firm—Ralph E. Krisher, Jr.

[57] ABSTRACT

An electrical circuit for connecting an electric motor to an electrical source of supply comprising a double pole single throw switch having four quick-connect terminals thereon. Two of said terminals are connected to the electrical source of supply and the other two of said terminals connected directly to the windings of the electric motor. A centrifugal switch is provided, mounted internally of the housing of the electric motor on an insulated electric circuit board. The supply leads bypass the electric circuit board on which the centrifugal switch is mounted, thus minimizing the number of terminals and electric circuit connections and increasing the reliability and safety of the circuit.

14 Claims, 5 Drawing Figures

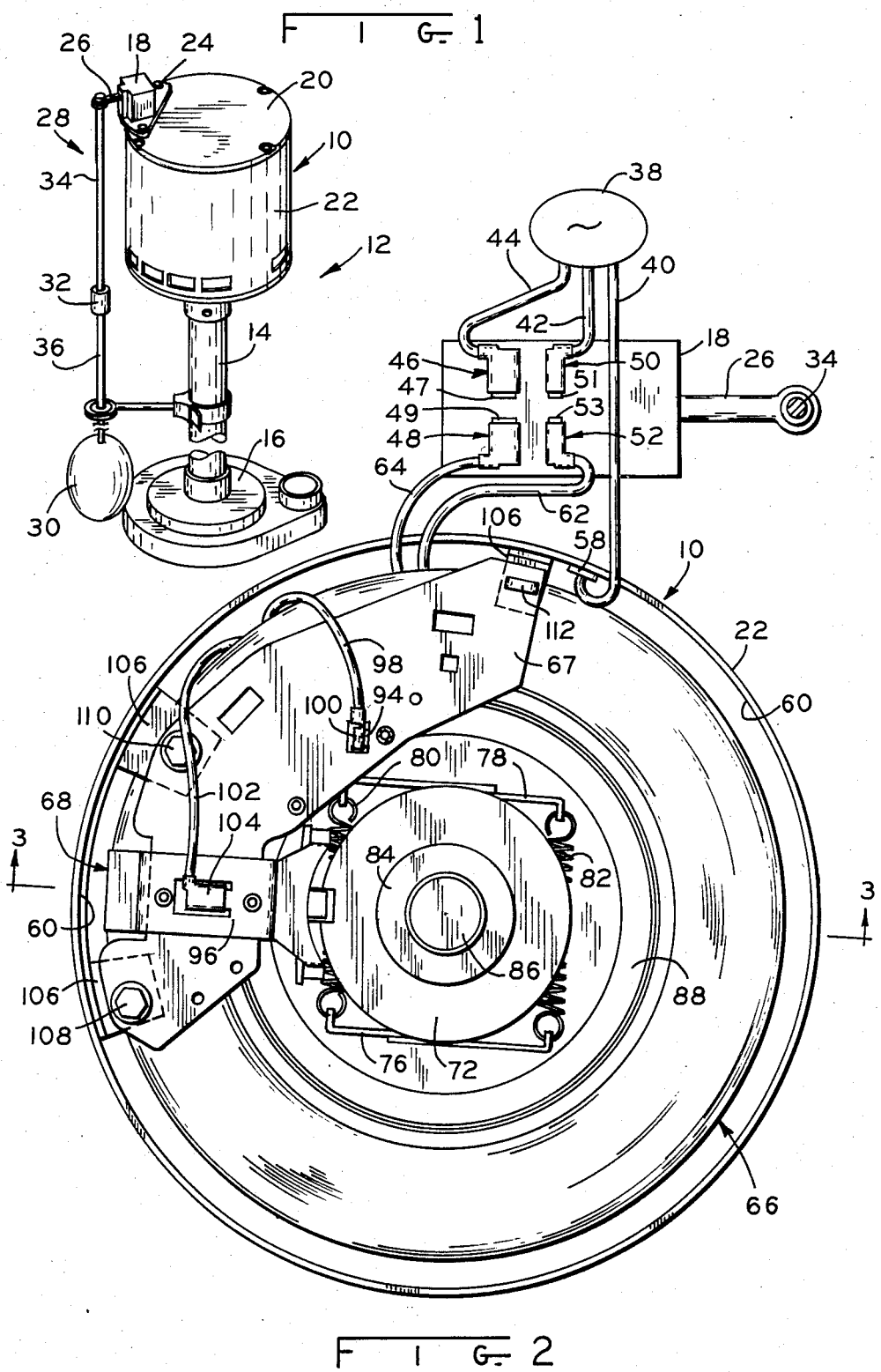

SUMP PUMP MOTOR SWITCH CIRCUIT

BACKGROUND OF THE INVENTION

The present invention pertains to a circuit for controlling an electric motor having run and start windings and for connecting the motor to a source of electrical supply. In particular, the invention pertains to a control circuit adapted for use with an electric sump pump motor and for connecting the motor to the control switches therefor and to a source of electrical supply.

Generally, prior art sump pump control circuits for connecting an electric sump pump motor to a source of electrical supply comprise a float operated actuator switch mounted on the motor housing, a centrifugal or other start switch for controlling the start winding mounted on a terminal board located inside the motor housing and conductors for interconnecting the switches and the motor windings to a source of electrical supply. The actuator switch and the terminal board both have electric terminals located thereon for interconnection with the remainder of the circuit. A line cord is generally connected to one pair of terminals on the actuator switch. Another pair of terminals on the actuator switch is connected by two conductors to a first pair of terminals mounted on the terminal board on which the centrifugal switch is mounted. A second pair of terminals on the centrifugal switch terminal board is connected by means of electrical conductors to the motor windings.

The terminals employed for the above-described connections are generally of the push-on or quick-connect type wherein an electrically conducting sleeve secured to the electrical conductor fits over a flat rectangular terminal mounted on a rigid insulating base. The sleeve is assembled to the terminal by pushing it on to the terminal and is retained thereon by friction fit.

One disadvantage of the known electric circuits for controlling electric motors is the multiplicity of terminals and connections needed to interconnect the various parts. The use of a multiplicity of terminals and connections is expensive because of the cost of the parts and the labor needed to assemble the parts. In addition, since in the prior art motor control circuits all the terminals are of one size, it is possible that in the assembly of the circuit the numerous terminals are connected incorrectly so that the motor circuit either does not function properly or is subject to failure. Furthermore, in the sump pump environment it is possible that quick-connect terminal connections will work loose due to vibration caused by operation of the motor and that the circuit will fail. It is, of course, self-evident that the possibility of such failure due to vibration is directly proportional to the number of terminals used in the assembly of the circuit.

In motor control circuits of the type described, it is customary to connect a motor protector switch in series circuit connection with the motor windings. This protector switch is responsive to excessive winding temperatures or current and will open in response thereto thereby deenergizing the motor. Since one of the electrical supply leads is normally grounded it is desirable to connect the protector switch to the ungrounded supply lead, so that, upon opening of the protector switch, the motor windings are completely disconnected from the ungrounded source of electric potential.

In the prior art circuits described, improper connection of the ungrounded supply lead was possible because of the use of identically sized terminals for both supply line lead connections to the motor circuit and subsequent possible errors in assembly. It is desirable to ensure that the grounded supply lead is connected to the side of the motor circuit which is not opened in case of opening of the protector switch. It was also possible in prior art arrangements to short out the motor and power supply by connecting both leads to one of the switch poles.

It is desirable, in motor control circuits, to connect the actuator switch directly to the motor windings, and to have the connecting leads bypass the terminal board upon which the centrifugal switch is mounted. With such an arrangement the junction terminals on the terminal board can be eliminated, the windings can be connected directly to the actuator switch with quick-connect terminations and assembly costs can be avoided.

It is also desirable to use keyed terminals in motor control circuits of the type described so that errors in assembly can be avoided.

It is also desirable in circuits of this type and particularly in the sump pump environment, to connect the line cord lead which is not grounded to the side of the motor circuit which is opened in case of a circuit failure.

SUMMARY OF THE INVENTION

The present invention overcomes the disadvantages of the prior art control circuit by using a reduced number of terminals for making the electrical connections in a motor control circuit.

More specifically, the present invention in one form thereof, overcomes the disadvantages of the prior art control circuits by connecting the terminals of the actuator switch directly to the motor windings thus bypassing the terminal board on which the centrifugal start switch is mounted. Furthermore, by using quick-connect terminals of different sizes the connecting leads are keyed for proper connection and the circuit of the present invention can be assembled quickly and properly without faulty connections.

In the circuit of one form of the present invention, an actuator switch is connected to a line cord by means of quick-connect push-on type of terminals which are keyed by means of size. The actuator switch is also connected directly to the motor windings by means of conductor leads which bypass the terminal board upon which the start winding switch is mounted. The conductor leads are connected to the motor windings by soldering or twisting of the conductor lead wires directly to the winding conductors. The centrifugal switch is mounted on a terminal board which can be of small size, because of the reduction of terminals on that board. The connections from the start winding switch to the remainder of the circuit are made by quick-connect push on type of terminals. The conductor lead terminations and connections to the actuator switch are also keyed and are also made by quick-connect push-on type of terminations. For purposes of this application, "push-on" or "quick-connect" terminals refer to terminals wherein the electrical connection is made by interconnecting the two halves of the connector through a simple relative pushing motion between the two halves.

It is an object of the present invention to provide a motor control circuit wherein the start winding switch terminal board is bypassed by the electrical conductors interconnecting the actuator switch and the motor windings.

It is another object of the present invention to provide an electric motor control circuit wherein the number of terminals is kept at a minimum and wherein the terminals are sized to mate only with specific ones of the sleeve connectors on the interconnecting leads.

It is yet another object of the present invention to provide a motor control circuit wherein the leads connecting the windings to the actuator switch are of the quick-connect type and are sized to be connectable respectively only to one terminal whereby the ungrounded side of the electrical supply is connectable only to the side of the motor circuit which will be opened by the motor protector switch in case of circuit failure.

The present invention, in accordance with one form thereof, overcomes the problems and disadvantages of the prior art control circuits by means of an electric motor control circuit comprising a switch housing mounted on the motor housing, a first pair of electric terminals which are located on the switch housing and are connected to supply line cord leads. A double pole single throw switch means is located in the switch housing and a second pair of electrical terminals is mounted on the switch housing and is connectable respectively to the first pair of electric terminals by the switch to thereby energize the windings. A switch means for controlling the start winding is preferably mounted on a terminal board located on the motor and which has first and second electrical terminals mounted thereon. A first continuous electrical conductor has one end connected to a first terminal of the second pair of terminals and has its other end connected to a first end of both the start and windings, bypassing the terminal board. A second continuous electrical conductor bypasses the terminal board and has one end thereof connected to a second terminal of the second pair of terminals and has its other end connected directly to a second end of the run winding. A third continuous electrical conductor connects a second end of the start winding to the first of the start winding switch terminals and a fourth continuous electrical conductor connects the second of the start switch terminals to the second end of the run winding.

The invention further provides, in one form thereof, in an electric motor comprising a housing and run and start windings, an electric circuit for connecting the motor to a source of electrical supply. The circuit comprises a line cord including two leads, one of the leads being grounded. A double pole single throw electric switch is mounted on the housing, the switch comprising first and second terminals respectively connected to the two leads the first terminal being connected to the grounded, or neutral, lead. Third and fourth terminals are mounted on the switch, the first and third terminals and second and fourth terminals respectively are electrically connectable by the switch. A start winding switch is mounted on a terminal board which is operatively mounted on the housing. The start winding switch opens in response to motor speeds in excess of a predetermined speed. A thermal protector is operatively mounted on the winding, the protector comprising an electrical switch which opens in response to predetermined temperature. A first continuous electrical conductor directly connects the fourth terminal with one side of the thermal protector and bypasses the terminal board. A second electrical conductor directly connects the other side of the thermal protector to first ends of both the run and start windings. A third continuous electrical conductor directly connects the second end of the run winding to the third terminal bypassing the terminal board. A fourth continuous electrical conductor directly connects the second end of the start winding to one side of the centrifugal switch and a fifth continuous electrical conductor directly connects the other side of the centrifugal switch to the second end of the run winding.

Still further, in one form of the present invention, an electrical circuit for connecting a single phase electric motor to an electrical power supply source is provided, the motor having a housing, run and start winding, and a line cord for connecting the motor to the source of supply, the line cord comprising three leads, one of said leads being a ground lead. The circuit comprises a single pole, single throw start winding switch for controlling the start winding operably mounted on a terminal board, the terminal board being mounted on the housing. The start switch has first and second electrical terminals thereon, the switch being open when the motor reaches operating speed and being closed when the motor speed is less than operating speed. A double pole single throw electrical actuator switch is operably mounted on the motor housing, the switch having mounted thereon first and second pairs of electrical quick-connect terminals. The actuator switch poles are operatively associated with the terminal pairs for electrically connecting respective terminals of one said pair with the respective terminals of the other said pair. Each pair of quick-connect terminals includes a terminal of one configuration and a terminal of a second configuration incompatible with the first configuration. The compatible pair may be associated either with one of the switch poles or with the line or motor terminals. The line cord ground lead is connected to a ground connector mounted on the housing and the two other line cord leads are connected by quick-connect push on connectors to the first pair of terminals. A first continuous electrical conductor has a first end connected to a first terminal of the second pair of terminals and has its other end connected to a first end of both the start and run windings, the conductor bypassing the terminal board. A second continuous electrical conductor has a first end and directly connected to the second terminal of the second pair of terminals and has its other end connected to the second end of the run winding, the conductor bypassing the terminal board. A third continuous electrical conductor connects the second end of the start winding to the first terminal of the centrifugal switch and a fourth continuous electrical conductor directly connects the second terminal of the centrifugal switch to the second end of the run winding.

BRIEF DESCRIPTION OF THE DRAWINGS

FIG. 1 is a perspective view of a sump pump and electric motor for driving the pump;

FIG. 2 is a broken away top sectional view of the motor of FIG. 1 in a preferred embodiment of the present invention;

DESCRIPTION OF THE PREFERRED EMBODIMENT

Figure 3:
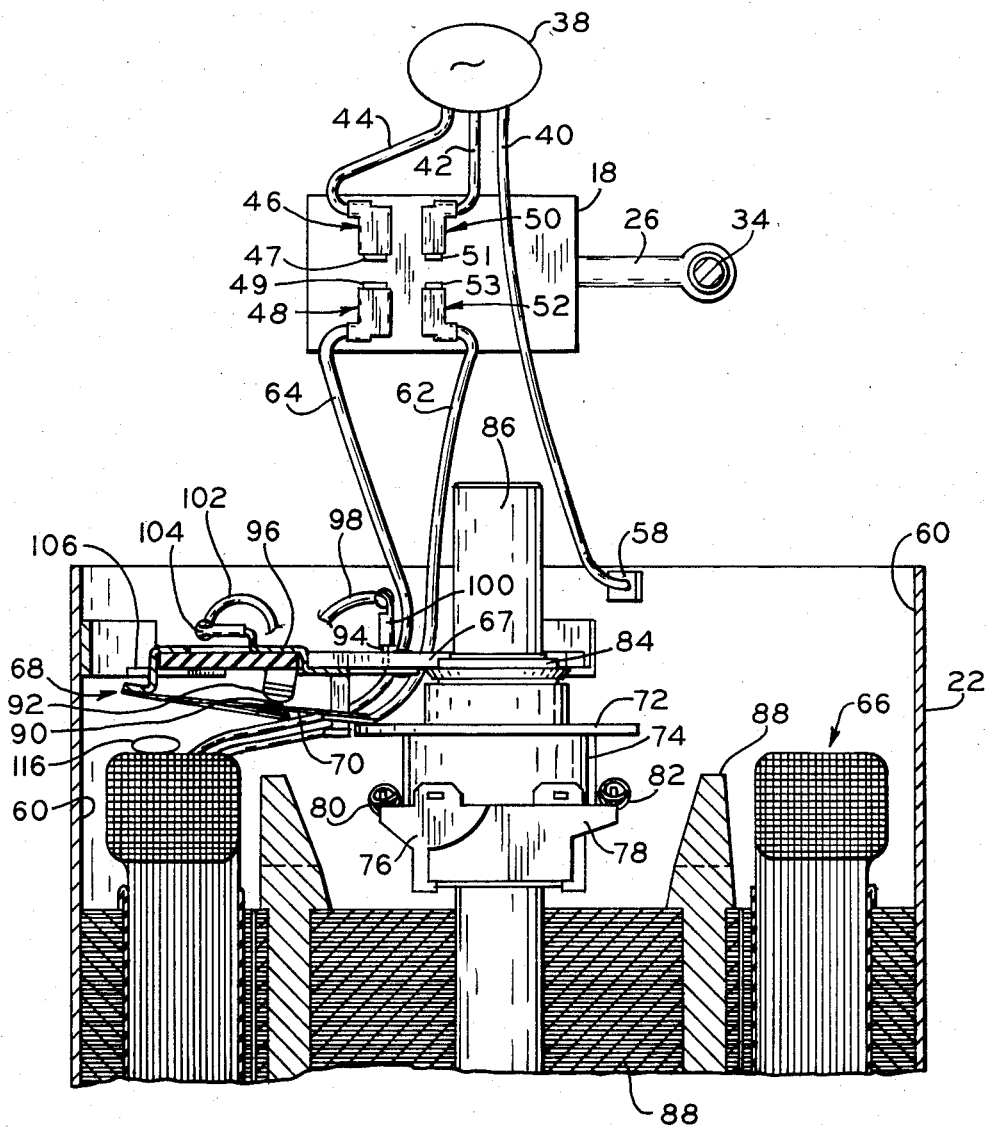
FIG. 3 is a sectional view taken along lines 3—3 of FIG. 2 and viewed in the direction of the arrows.

Referring now to FIG. 1, an electric motor 10 is shown as part of a sump pump assembly 12 and supported therein by means of a support column 14. Support column 14 houses a rotatable shaft (not shown) which is driven by the electric motor 10 for rotating a pump impeller (not shown) located in a housing 16. Electrical actuating switch 18 is shown mounted on the top cover 20 of the motor housing 22 and is secured thereto by means of screw fasteners 24. An actuator lever 26 for actuating switch 18 is secured to an actuator rod 28. Actuator rod 28 is connected at its lower end to a float 30. The sump pump 12 is normally located in an area wherein the water level is to be controlled and is prevented from exceeding a certain level. The pump 12 is placed so that, as the water level rises, float 30 will move upwardly and by means of actuator rod 28, will actuate actuator lever 26 and switch 18. Sleeve 32 threadably engages actuator rod portions 34 and 36 and is provided for adjusting the water level at which switch 18 will be actuated and deactivated by float 30.

Turning now to FIG. 2, a top sectional view of electric motor 10 is shown with top cover 20 of the motor removed. A source of electrical supply 38 is indicated schematically from which leads or conductors 40, 42 and 44 of an electric line cord lead to corresponding junction or termination points in the electric circuit to supply electric power thereto. Switch 18 is illustrated schematically. The switch includes an actuator lever 26 and an actuator rod portion 34 connected thereto. Wires 42, 44, 62, and 64 are connected by means of quick-connect push-on connectors 46, 48, and 50, 52 which include respective male terminals 47, 49, 51 and 53 fastened to switch 18. Switch 18 is similar to the model 84594AM pedestal switch manufactured by the Arrow-Hart Division of Crouse-Hinds, Hartford, Conn., except that the leads and quick-connect terminals have been modified as described herein. Connector pairs 46, 48, and 50, 52 are preferably of two different sizes as will be further explained hereinafter. Conductor 40 is a ground lead for grounding the motor circuit. Conductor 40 is not connected to the electrical switch 18, but instead bypasses electric switch 18 and is connected directly to a grounding lug 58 located on conducting inner wall 60 of motor housing 22. Conductor 40 is connected at its other end to a source of ground potential at electrical source of supply. The connection of conductor 40 ensures that the external metallic parts of motor 10 and sump pump 12 will be grounded and that persons touching the external parts of the motor 10 and sump pump 12 will not be subjected to electric shock.

The pair of quick-connect terminals 48 and 52 on switch 18 are directly respectively connected by means of continuous electrical conductors 64 and 62 to the motor run and start windings assembly 66 as illustrated in FIG. 3. The connections between the conductors 62 and 64 to switch 18 are by way of quick-connect sleeve connectors 48 and 52 which are attached to the ends of the conductors 64 and 62.

It should be understood that any type of quick-connect terminations may be used to practice the invention. In the preferred embodiment shown, the sleeve type push-on female connectors and spade-type male terminals are used. A feature of the present invention, in one form thereof, is the use of keyed terminations, i.e. terminations of different configurations, such as different sizes. By using terminals of different configurations properly mated to matching sleeve type connectors, errors in assembly are prevented. The use of sleeve type connectors each mating with only one terminal will prevent assembly errors, thereby preventing the above described malfunctions and failures of the prior art motor connection circuits. It should be understood that other types of keying of the terminals and connectors can be used such as varying shapes.

Connector 46 is of the same size as connector 48 and connector 50 is of the same size as connector 52 as are their respective male terminals. Male terminals 47 and 49 are connectable electrically by means of a switch blade or the like (not shown) of switch 18 when the switch is actuated by actuator rod 28. Male terminals 51 and 53 are similarly connectable upon actuation of switch 18 by a second switch blade or the like (not shown) of the switch. The switch 18 is a double pole, single throw switch of conventional construction well known in the prior art.

Rather than having both terminals of the same polarity being of the same size, the terminals on either the line side or motor side of switch 18 could be similarly sized. By color coding the wires, correct polarity during assembly would be ensured.

An electrically insulated circuit board 67 has mounted thereon a centrifugal switch 68. As best illustrated in FIGS. 2 and 3, the centrifugal switch 68 has an actuator lever 70 which is actuated by a flange 72 of spool member 74. The centrifugal switch actuating mechanism includes a pair of flyweights 76 and 78. The flyweights 76 and 78 are normally biased inwardly by springs 80 and 82 whereby the spool member 74 is urged into its uppermost position as indicated in FIG. 3. In this position, spool 74 bottoms out against stop ring 84 which is secured to shaft 86. When actuator switch 18 is actuated and motor rotor 88 begins to rotate, flyweights 76 and 78 will move outwardly as permitted by hinging portions (not shown) of the flyweights. The centrifugal force of the outward movement of flyweights 76 and 78 operates against the biasing force of springs 80 and 82. As the flyweights 76 and 78 move outwardly, spool 74 is forced to move downwardly by lever arm portions (not shown) of flyweights 76 and 78 whereby flange 72 will actuate switch lever arm 70 thereby allowing switch contacts 90 and 92 to disengage and opening the centrifugal switch 68. The centrifugal switch activating mechanism heretofore described is of conventional construction. Other types of start winding switches are also contemplated herein.

Centrifugal switch 68 is normally closed and is in series circuit connection with start winding 120 of motor 10 as described hereinafter in connection with FIG. 5. Therefore, as motor 10 reaches operating speeds, centrifugal switch 68 will open and disconnect the motor start winding from the source of electric supply 38. Centrifugal switch 68 is a single pole, single throw switch and has two quick-connect spade terminals 94 and 96 for connecting the switch in the electrical circuit. Terminal 94 has an electrical conductor 98 connected thereto by means of a sleeve type push-on connector 100 for directly connecting one end of the switch to the electric motor windings. Terminal 96 has an electrical conductor 102 connected thereto by means of a push-on sleeve type connector 104 for directly connecting the other side of the switch to the motor windings.

It should be noted that no power supply terminals other than terminals 94 and 96 are located on insulating circuit board 67. The circuit board 67 is secured to inside wall 60 of the electric motor housing 22 by means of projections 106 located on the inner wall 60 of the housing. Threaded fasteners 108 and 110 secure circuit board 67 to two of the projections 106. A spring-type fastener 112 secures circuit board 67 to a third projection 106 on the inside wall 60 of motor housing 22.

A feature of one form of the instant invention is the bypassing of circuit board 67 by conductors 62 and 64. In the prior art, conductors connected the terminals 49 and 53 of the actuator switch 18 to function terminals mounted on circuit board 67. Additional conductors connected the circuit board function terminals to motor windings 66. The circuit board function terminals served only as junction points and were only used to interconnect the conductors 62 and 64 leading from switch 18 to conductors leading from the windings. As pointed out above, this was disadvantageous because of cost factors and increased possibilities of improper connections and subsequent failures of the circuit due to loosening of the connections by vibration. The present invention overcomes these problems by eliminating the interconnections on circuit board 67 and by bypassing terminal board 67 with conductors 62 and 64.

Conductor leads 62 and 64 bypass circuit board 67 and connect switch 18 directly with motor windings 66 and thermal protector 116. The connections with the motor windings 66 can be by any suitable means such as by soldering or twisting the wires together and then securing the connection.

FIG. 3 shows the motor windings 66 disposed circumferentially around rotor 88. When the motor is energized, windings 66 create a rotating magnetic field to cause rotor 88 to rotate and thereby causing rotation of the drive shaft and sump pump impeller.

The structure described up to this point has been the actual circuit elements including the conductor leads, electrical termination connectors, switches, housings and the like. To assist in an understanding of the operation of the invention and the functioning of the circuit, schematic diagrams of a prior art circuit and the circuit according to one form of the present invention are shown in FIGS. 4 and 5.

Figure 4:
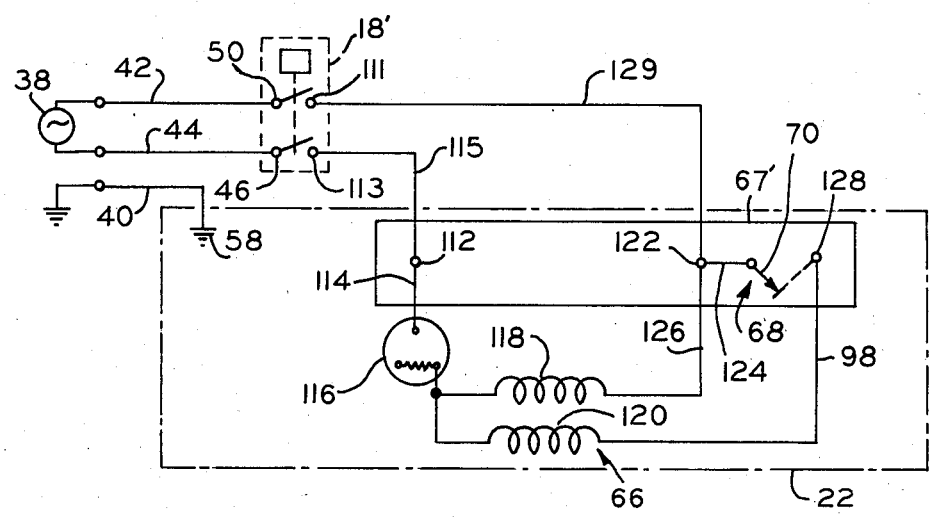
FIG. 4 is a schematic wiring diagram of a prior art electric circuit for connecting an electric motor to a source of supply.

Turning now to FIG. 4, a prior art electrical control circuit is shown for connecting an electric motor 10 to an electrical source of supply 38. It should be noted that elements corresponding to elements in FIGS. 1-3 are numbered similarly. The electrical source of supply is shown schematically at 38. A ground lead 40 for grounding the motor housing 22 is shown schematically. An actuator switch 18' is shown having a double pole single throw construction. Four terminations 46, 50, 111 and 113 are shown on actuator switch 18' for connecting the switch in the circuit. One side of the electrical supply line is connected by means of lead 115 hard wired to terminal 113 to a double quick-connect junction point 112 on circuit board 67'. As pointed out above, the only function of junction point 112 is to interconnect lead 115 and conductor 114. Junction point 112 consists of two spade type terminals which are connected to push-on quick-connect sleeve type connectors on conductors 115 and 114. Conductor 114 connects a thermal protector 116 to junction point 112. The other side of thermal protector 116 is connected to one end of both the run and start windings 118 and 120 respectively by a quick-connect connector. The second end of run winding 118 is connected by conductor 126 to another junction point 122 on circuit board 67', which junction point comprises a quick-connect terminal. The second end of start winding 120 is connected by conductor 98 to a quick-connect junction point 128 connected to one side of centrifugal switch 68 on circuit board 67'. The other side of centrifugal switch 68 is connected to junction point 122, which comprises a second quick-connect terminal. Junction point 122 is similar to junction point 112 in that its function is to interconnect lead 129 and conductor 126. Additionally, quick-connect junction point 122 is connected by conductor 124 to switch blade 70 of centrifugal switch 68.

From junction point 122 a continuous conductor 129 is hard wired to terminal 111 of switch 18'. It is preferable that the ungrounded side of the supply line be connected to thermal protection switch 116. By connecting the ungrounded side of the supply line to protector switch 116, in case of failure of the circuit, the high or ungrounded side of the line is opened and the motor circuit will be at ground potential. By having the terminals of switch 18' all of the same size it is easier to make an improper connection of the circuit leads, thereby grounding the wrong side of the control circuit.

Figure 5:
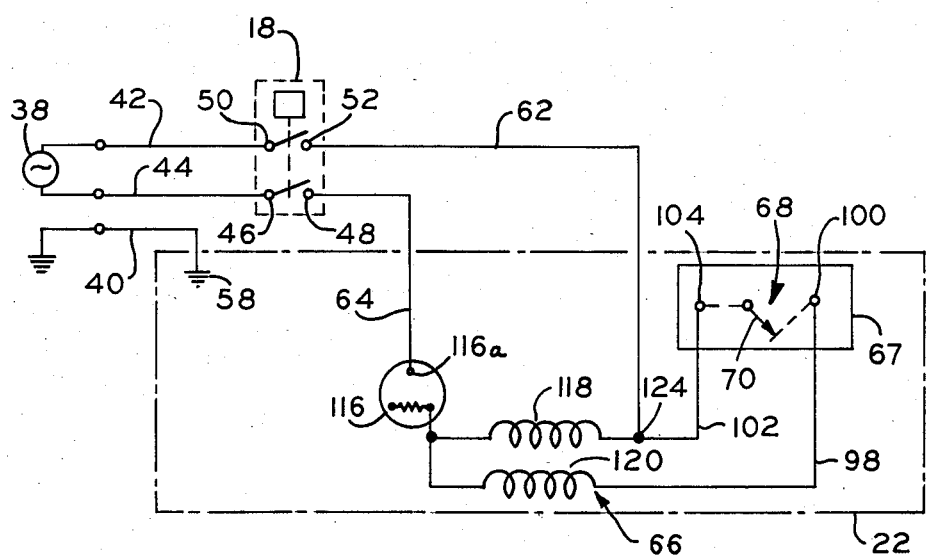
FIG. 5 is a schematic wiring diagram of a preferred embodiment of the control circuit of the present invention.

Turning now to FIG. 5, a preferred embodiment of the circuit of the present invention is shown. A supply of electrical power 38 is shown which is connected by conductors 42 and 44 to quick-connect terminals 46 and 50. The connection is made by means of push-on female sleeve type connectors located at the ends of conductors 42 and 44. Lead 42 is connected to the grounded side of the electrical source of supply 38. As explained hereinabove, quick-connect terminals 46 and 50 are keyed by being of two different sizes so that the connections of leads 42 and 44 cannot be made improperly and the correct side of the electrical control circuit is grounded. Terminals 48 and 52 are also similarly keyed to prevent errors in circuit connection. All the terminations are of the quick-connect type wherein a conducting sleeve fastened to a conductor is pushed onto a flat rectangular quick-connect spade type of terminal connector. By using connectors of different sizes the possibility of improperly assembling the circuit is minimized.

As indicated earlier, alternatively, terminals 46 and 50 could be sized differently than terminals 48 and 52 to prevent shorting out of the motor and supply. Wire color coding would then ensure proper polarity.

An electrical conductor 64 connects terminal 48 directly to a hard wired connection 116a on thermal protector 116 which is located in intimate physical contact with the start and run windings 118 and 120 as shown in FIG. 3. The connection 116a of lead 64 to the thermal protector may be made by any suitable means such as by soldering or twisting the conductor ends together. The other side of the thermal protector 116 is connected directly to one side of both windings 118 and 120 by soldering the leads of the windings 66 and thermal protector 116 together. Thermal protector 116 comprises a conventional thermally activated switch such as an electrical bimetal switch which will open in response to a predetermined temperature of the windings. Protector 116 is in intimate physical contact with the windings to thereby precisely sense the temperature of the windings and to prevent further actuation of the windings 66 when the temperature exceeds an undesired level.

The second side of start winding 120 is connected by means of a continuous electrical conductor 98 directly to a quick-connect terminal 100 on circuit board 67'. A centrifugal switch 68 is mounted on the circuit board 67. The other side of switch 68 is connected to a second terminal 96 on the circuit board 67. Terminal 96 is connected to a junction point 124 by means of conductor 102 and quick-connect sleeve 104. Junction point 124 is located directly on the winding 118 and does not require an additional electrical terminal as the ends of conductor 102 and 62 are soldered or otherwise connected directly to the winding termination. A continuous electrical conductor 62 hard wired to point 124 connects junction point 124 to quick-connect terminal 52 of switch 18.

In summary, what has been provided is an electric circuit having a minimum of circuit terminations. Instead of using junction points 112 and 122 as shown in the prior art circuit of FIG. 4, junction points on terminal circuit board 67 are eliminated. Connections of the circuit are made by conductors 62 and 64 leading directly from the windings 66 to switch 18, bypassing the circuit board 67. By comparing the circuits of FIGS. 4 and 5, it can be seen that the number of terminals in the improved circuit of FIG. 5 has been reduced. Thus, an electric circuit has been provided for connecting an electric motor to an electrical source of supply which has a minimum number of electrical circuit connections whereby the circuit is simple to construct and inexpensive to assemble. In addition, the circuit is more reliable than the prior art circuit by means of the keyed terminals of the electrical switch 18 which ensure proper grounding and by minimizing the junction points which must be assembled by quick-connect terminals. By minimizing the number of electrical terminals and connections a more reliable circuit is provided than has been used in the past, less parts are used, and less conductor leads are needed. Furthermore, by not using the connections on circuit board 67 a smaller circuit board can be used.

It can readily be understood that while the electric circuit is shown in the sump pump environment, many other applications of the control circuit are possible.

Although a particular apparatus has been disclosed as preferred for accomplishing the invention, it is contemplated that changes as to the precise arrangement, shapes, details and connections of the component parts of such apparatus may be made by those having ordinary skill in the art without departing from the spirit of the invention of the scope thereof as set forth by the claims which follow.

We claim:

1. In an electric motor comprising a housing, run and start windings, an electric circuit connecting said motor to a line cord comprising two leads, said circuit comprising:
    a switch housing mounted on said motor housing;
    a double pole single throw switch in said switch housing having a first pair of electrical terminals mounted on switch housing and connected to said line cord leads;
    said switch including a second pair of electrical terminals mounted on said switch housing and connectable respectively to said first pair of electrical terminals by said switch to energize the windings;
    start switch means for controlling said start winding being operably mounted on a terminal board located on said motor and having first and second electrical terminals mounted thereon;
    a first continuous electrical conductor having one end connected to a first terminal of said second pair of terminals and having its other end connected to a first end of both the start and run windings and bypassing the terminal board;
    a second continuous electrical conductor having one end connected to a second terminal of said second pair of terminals and its other end bypassing said terminal board and directly connected to a second end of said run winding;
    a third continuous electrical conductor connecting a second end of said start winding to the first of said start winding switch terminals; and
    a fourth continuous electrical conductor connecting the second of said start switch terminals to the second end of said run winding.

2. The circuit of claim 1 wherein the terminals of said first and second pairs of terminals are quick-connect terminals.

3. The circuit of claim 1 wherein the first pair of electric terminals comprise a terminal of a first and second configurations respectively and said first and second terminals of said second pair of terminals are of said first and second configurations, respectively.

4. The circuit of claim 1 including a thermal protector means operatively connected to said windings for disconnecting said windings from said source of supply when winding temperature exceeds a predetermined limit, said protector being connected in series with said first electrical conductor and both said start and run windings.

5. The circuit of claim 1 wherein said line cord includes a ground lead, said ground lead connected to an electrical grounding means on said motor housing for electrically grounding said motor.

6. The circuit of claim 1 wherein the first and second terminals on said start winding switch terminal board are of the quick-connect type and are of first and second configurations respectively.

7. The circuit of claim 1 wherein said line cord lead connected to said second end of said run winding is electrically grounded.

8. The circuit of claim 1 wherein said terminal board comprises an electrically insulating circuit board secured to an inside wall of said housing and having mounted thereon said start winding switch, said switch comprising an electrical connector for connecting said start switch terminals, an actuating arm operably connected to said connector and actuable by speed responsive means connected to said rotor.

9. In an electric motor comprising a housing, run and start windings, an electric circuit for connecting said motor to a source of electrical supply line cord including two leads, one of said leads being grounded, said circuit comprising;
    a double pole, single throw electric switch mounted on said housing, said switch comprising first and second terminals respectively connected to said two leads, said first terminal being connected to said grounded lead, and third and fourth terminals, said first and third terminals and second and fourth terminals, respectively, being electrically connectable by said switch;
    a speed responsive switch mounted on a terminal board, operatively mounted on said housing, said centrifugal switch opening in response to motor speeds in excess of a predetermined speed;
    thermal protector means operatively mounted on said windings, said protector means comprising an electrical switch which opens in response to a predetermined windings temperature;

a first continuous electrical conductor directly connecting said fourth terminal with one side of said thermal protector, said conductor bypassing said terminal board;

a second electrical conductor directly connecting the other side of the thermal protector to first ends of both said start and run windings;

a third continuous electrical conductor directly connecting a second end of said run winding to said third terminal, said conductor bypassing said terminal board;

a fourth continuous electrical conductor directly connecting a second end of said start winding to one side of said centrifugal switch; and a fifth continuous electrical conductor directly connecting the other side of said centrifugal switch to said second end of said run winding.

10. The circuit of claim 9 wherein said line cord includes a ground lead, said ground lead directly connected to an electrical connector mounted on said motor housing for electrically grounding said motor.

11. The circuit of claim 9 wherein the first and third electrical terminals are of a first size and said second and fourth terminals are of a second size, different from said first size.

12. The circuit of claim 9 wherein said terminal board comprises an electrically insulated circuit board and said centrifugally operated switch comprises two quick-connect terminals mounted on said circuit board, an electrical connector for connecting said circuit board terminals, an actuating arm operably connected to said connector and actuable by speed responsive means connected to said rotor, said circuit board being mounted on an inside wall of said motor housing.

13. An electric circuit for connecting a single phase electric motor to an electrical power supply source, said motor having a housing, a run and a start winding, a line cord for connecting said motor to said source of supply, said line cord comprising three leads, one of said leads being a ground lead, said circuit comprising:

a centrifugally operated single pole, single throw switch means for controlling said start winding operably mounted on a terminal board, said terminal board mounted on said housing said switch means having first and second electrical terminals mounted thereon, and said switch means being open when the motor reaches operating speed and being closed when the motor speed is less than said operating speed;

a double pole, single throw electrical switch operably mounted on said motor housing, said switch having mounted thereon first and second pairs of electrical quick-connect terminals, each pair of quick-connect terminals including a terminal of one configuration and a terminal of a second configuration incompatible with the first configuration;

said line cord ground lead connected to a ground connector mounted on said housing and said two other line cord leads connected by quick-connect push-on connector to two of said quick-connect terminals;

a first continuous electrical conductor having a first end connected to a third said quick-connect terminal and having its other end connected to a first end of both said start and run windings, said conductor bypassing said terminal board;

a second continuous electrical conductor having a first end directly connected to a fourth said quick-connect terminal and having its other end connected to the second end of said run winding;

a third continuous electrical conductor connecting a second end of said start winding to the first terminal of said centrifugal switch; and a fourth continuous electrical conductor directly connecting the second terminal of said centrifugal switch to the second end of said run winding.

14. The circuit of claim 13 wherein the pairs of terminals are connected respectively to the line cord and motor.

* * * * *